(12) United States Patent
Aotsuka et al.

(10) Patent No.: US 7,690,890 B2
(45) Date of Patent: Apr. 6, 2010

(54) WALL CONFIGURATION OF AXIAL-FLOW MACHINE, AND GAS TURBINE ENGINE

(75) Inventors: Mizuho Aotsuka, Tokorozawa (JP); Hiroshi Hamazaki, Iruma (JP); Akira Takahashi, Kawasaki (JP); Haruyuki Tanimitsu, Tokyo (JP)

(73) Assignee: Ishikawajima-Harima Heavy Industries Co. Ltd. (JP)

( * ) Notice: Subject to any disclaimer, the term of this patent is extended or adjusted under 35 U.S.C. 154(b) by 569 days.

(21) Appl. No.: 11/570,325

(22) PCT Filed: Sep. 22, 2005

(86) PCT No.: PCT/JP2005/017515

§ 371 (c)(1),
(2), (4) Date: Dec. 8, 2006

(87) PCT Pub. No.: WO2006/033407

PCT Pub. Date: Mar. 30, 2006

(65) Prior Publication Data

US 2007/0258810 A1 Nov. 8, 2007

(30) Foreign Application Priority Data

Sep. 24, 2004 (JP) .......................... P2004-277114

(51) Int. Cl.
*F01D 9/02* (2006.01)
(52) U.S. Cl. .................... 415/191; 416/193 A
(58) Field of Classification Search ................ 415/191, 415/914; 416/193 A, 248
See application file for complete search history.

(56) References Cited

U.S. PATENT DOCUMENTS

| 2,735,612 A | 2/1956 | Hausmann | 230/122 |
| 2,918,254 A | 12/1959 | Hausammann | 253/65 |
| 3,529,631 A | 9/1970 | Riollet | 138/39 |
| 4,465,433 A | 8/1984 | Bischoff | 416/223 |
| 5,397,215 A | 3/1995 | Spear et al. | 415/191 |

(Continued)

FOREIGN PATENT DOCUMENTS

FR  1 602 965  4/1971

(Continued)

OTHER PUBLICATIONS

Martin G Rose, "Non-Axisymmetric endwall profiling in the HP NGV'S of an axial flow gas turbine", the american society of Mechanical Engineers, 94-GT-249, 1994.

*Primary Examiner*—Edward Look
*Assistant Examiner*—Dwayne J White
(74) *Attorney, Agent, or Firm*—Ostrolenk Faber LLP (57) ABSTRACT

A wall configuration of an axial-flow machine which can reduce the secondary flow loss is provided. A trough is formed between a blade and another blade in the blade row and extends in at least an axial direction of the blade row. The region where the trough is formed is axially between a leading edge and a trailing edge of the blade. A center line of the trough has a curvature in the same direction as a camber line of the blade. A maximum amplitude of the trough is located adjacent to an axial center of the blade or located axially between the axial center and the leading edge of the blade.

20 Claims, 9 Drawing Sheets

U.S. PATENT DOCUMENTS

| | | | |
|---|---|---|---|
| 5,466,123 A | 11/1995 | Rose | 415/182.1 |
| 6,017,186 A | 1/2000 | Hoeger et al. | 415/181 |
| 6,283,713 B1 | 9/2001 | Harvey et al. | 416/193 |
| 6,338,609 B1 | 1/2002 | Decker et al. | 415/173.1 |
| 6,419,446 B1 | 7/2002 | Kvasnak et al. | 415/191 |
| 6,511,294 B1 | 1/2003 | Mielke et al. | 416/193 |
| 6,561,761 B1 | 5/2003 | Decker et al. | 415/173.1 |
| 6,669,445 B2 | 12/2003 | Staubach et al. | 416/193 |
| 6,837,679 B2 | 1/2005 | Kawarada et al. | 415/191 |
| 2002/0127108 A1 | 9/2002 | Crall et al. | 416/213 |
| 2003/0170124 A1* | 9/2003 | Staubach et al. | 416/193 A |

FOREIGN PATENT DOCUMENTS

| | | |
|---|---|---|
| JP | 06-257596 | 9/1994 |
| JP | 06-257597 | 9/1994 |
| JP | 2002-276301 | 9/2002 |
| JP | 2002-276301 A | 9/2002 |
| JP | 2003-269384 | 9/2003 |

* cited by examiner

<REGION A>

FIG. 6C

<REGION C>

FIG. 9B
EMBODIMENT

FIG. 10

WALL CONFIGURATION OF AXIAL-FLOW MACHINE, AND GAS TURBINE ENGINE

CROSS REFERENCE TO RELATED APPLICATION

The present application is a 35 U.S.C. §§ 371 national phase conversion of PCT/JP2005/017515, filed 22 Sept. 2005, which claims priority of Japanese Patent Application No.P2004-277114filed 24 Sept. 2004, which is herein incorporated by reference. The PCT International Application was published in the Japanese language.

TECHNICAL FIELD

The present invention relates to a wall configuration of a radial wall facing a flow path of an axial-flow machine.

This application claims priority on Japanese Patent Application No. 2004-277114 filed Sep. 24, 2004, the contents of which are incorporated herein by reference.

BACKGROUND ART

In an axial-flow machine such as a gas turbine engine or the like having a blade row, inner and outer radial walls surround a flow path and a boundary layer grows on the wall. In the boundary layer on the wall, a secondary flow having a different velocity component from a main flow is generated due to, for example, pressure gradient between the blades. It is known that the secondary flow causes a pressure loss (energy loss).

As one means for reducing the secondary flow loss, there is an art in which a slope is provided on the radial wall facing the flow path to moderate the pressure gradient between the blades, as disclosed in U.S. Pat. No. 6,283,713.

DISCLOSURE OF INVENTION

Problems to be Solved by the Invention

Recently, in the axial-flow machine such as the gas turbine engine or the like, there is a trend to reduce the thickness of the blade/vane in order to make it more lightweight, etc. In the blade row using thin profile blades, a flow separation tends to be partially generated in the vicinity of each pressure surface of the blades. When the flow separation interacts with the boundary layer on the wall, a strong vortex having a different flow direction/axis from the main flow is generated, and the vortex causes a pressure loss (energy loss). In the conventional art, the loss by the strong vortex is not reduced adequately.

An object of the present invention is to provide a wall configuration of an axial-flow machine and a gas turbine engine, which can reduce the loss due to the secondary flow.

Means For Solving The Problem

According to one aspect of the present invention, there is provided a wall configuration of a radial wall facing a flow path of an axial-flow machine that includes a blade row. The wall configuration includes a trough formed between a blade and another blade in the blade row and substantially extending in an axial direction of the blade row. The region where the trough is formed is axially between a leading edge and a trailing edge of the blade. A center line of the trough has a curvature in the same direction as a camber line of the blade. A maximum amplitude of the trough is located adjacent to a center of the blade in the axial direction or located between the axial center of the blade in the axial direction and the leading edge of the blade.

In the wall configuration of the invention, it is preferable that the maximum amplitude of the trough be located within 20 to 60 percent of an axial distance between the leading edge and the trailing edge of the blade from the leading edge of the blade.

It is preferable that the maximum amplitude of the trough be located within 30 to 50 percent of the axial distance between the leading edge and the trailing edge of the blade from the leading edge of the blade.

In the wall configuration of the invention, it is preferable that at least a part of the center line of the trough be non-parallel to the camber line of the blade.

In the wall configuration of the invention, it is preferable that a part of the trough be near to a suction surface of the blade from the vicinity of the middle of the blade to the vicinity of the trailing edge of the blade.

In the wall configuration of the invention, it is preferable that a distance between the center line of the trough and a suction surface of the blade have a shortest distance in a vicinity of the trailing edge of the blade.

In the wall configuration of the invention, it is preferable that a circumferential wall profile at each of positions corresponding to the leading edge and the trailing edge of the blade be an arc.

In the wall configuration of the invention, it is preferable that a circumferential wall profile in a vicinity of the leading edge of the blade include a convex profile (positive curvature) adjacent to a pressure surface of the blade and another convex profile (positive curvature) adjacent to a suction surface of the blade.

In the wall configuration of the invention, it is preferable that a circumferential wall profile in a vicinity of the trailing edge of the blade include a concave profile (negative curvature) adjacent to a suction surface of the blade.

In such a case, it is preferable that the circumferential wall profile in the vicinity of the trailing edge of the blade further include a convex profile (positive curvature) adjacent to a pressure surface of the blade.

In the wall configuration of the invention, it is preferable that a contour along a pressure surface of the blade include a convex region in the vicinity of the leading edge of the blade and another convex region in the vicinity of the trailing edge of the blade.

In the wall configuration of the invention, it is preferable that a contour along a suction surface of the blade include a convex region in the vicinity of the leading edge of the blade and a concave region in the vicinity of the trailing edge of the blade.

In such a case, it is preferable that the concave region in the vicinity of the trailing edge of the blade be 50 percent or less of a chord length of the blade.

According to another aspect of the present invention, there is provided a gas turbine engine that includes stator vanes and rotor blades, wherein at least one of a wall at a hub side of the stator vanes, a wall at a tip side of the stator vanes, a wall at a hub side of the rotor blades, and a wall at a tip side of the rotor blades has the wall configuration of the invention.

For the gas turbine engine, for example, a turbo-fan engine, a turbo-jet engine, a turbo-prop engine, a turbo-shaft engine, a turbo ram jet engine, a gas turbine for power generation, or a marine gas turbine is used.

Effects of The Invention

In the wall configuration of the flow machine of the invention, the loss by the secondary flow can be reduced.

Furthermore, in the gas turbine engine of the invention, the performance can be improved with the reduction of the loss due to the secondary flow.

DESCRIPTION OF THE REFERENCE SYMBOLS 10, 11, 12, 13: rotary drum (base), 14: blade (rotor blade), 15, 16, 17, 18: casing (base), 19: vane (stator vane), 20: leading edge, 21: trailing edge, 22: camber line of blade, 23 pressure surface (P.S.), 24: suction surface (S.S.), 29: chord, 30: blade row, 31: wall, 40: trough, 41: center line of trough, 45: flow separation, 46: vortex, 50, 51, 54: convex portion, 55: concave portion, 60, 61, 64, 65: convex region, 66: concave region

BEST MODE FOR CARRYING OUT THE INVENTION

Figure 1:
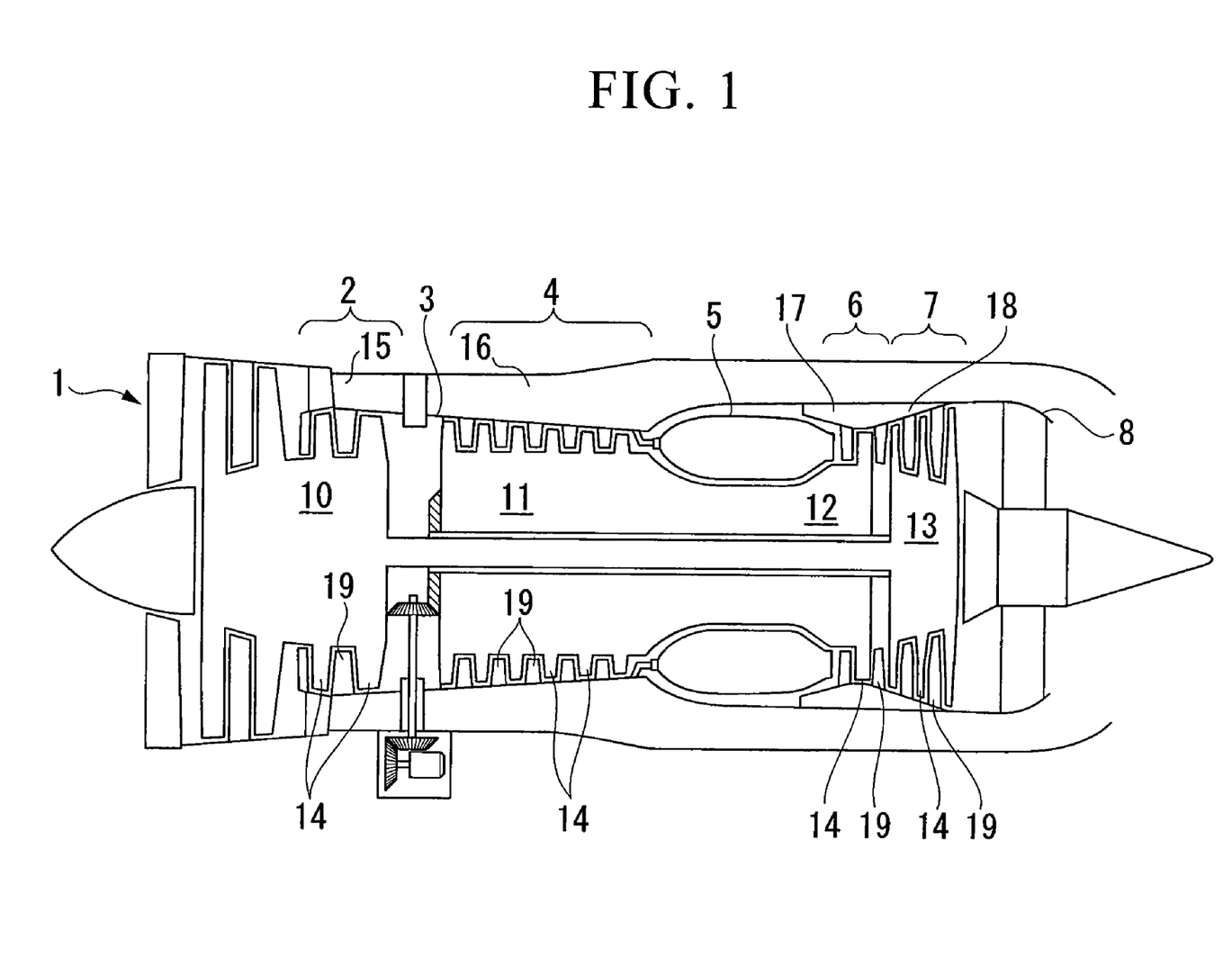
FIG. 1 is a schematic sectional view showing a gas turbine engine that is usable for an aircraft or the like, as an example of an axial-flow machine to which the present invention is applicable.

FIG. 1 is a schematic sectional view showing a gas turbine engine (turbo-fan engine) that is usable for an aircraft or the like, as an example of an axial-flow machine to which the present invention is applicable.

The gas turbine engine includes, for example, an air intake 1, a fan/low-pressure compressor 2, an exhaust fan duct 3, a high-pressure compressor 4, a combustion chamber 5, a high-pressure turbine 6, a low-pressure turbine 7, and an exhaust duct 8.

Each of the fan/low-pressure compressor 2, high-pressure compressor 4, high-pressure turbine 6, and low-pressure turbine 7 includes: a rotor having blades (rotor blades) 14 that are provided on the outer circumference of each of rotary drums 10, 11, 12, and 13 as a base and are circumferentially spaced apart from each other; and a stator having vanes (stator vanes) 19 that are provided on the inner circumference of each of annular casings 15, 16, 17, and 18 as a base and are circumferentially spaced apart from each other.

A plurality of the blades 14 extends outward from each of the rotary drums 10, 11, 12, and 13. A plurality of the vanes 19 extends inward from each of the casings 15, 16, 17, and 18. A flow path (an axial flow path) having an annular shape is formed between each of the rotary drums 10, 11, 12, and 13 and corresponding each of the casings 15, 16, 17, and 18.

In the fan/low-pressure compressor 2 and the high-pressure compressor 4, the pressure of a working fluid increases along the flow direction of the working fluid in the axial-flow path. In the high-pressure turbine 6 and the low-pressure turbine 7, the pressure of the working fluid decreases along the flow direction of the working fluid in the axial-flow path.

The circumferential wall of the rotor at a hub side of the blades 14 is a radial inner wall (an inner end wall) for the axial-flow path. The circumferential wall of the stator at a hub side of the vanes 19 is a radial outer wall (an outer end wall) for the axial-flow path.

In the case where a circumferential wall (for example, a shroud wall) of the rotor is provided at a tip of the blades 14, the tip side wall is a radial outer wall (an outer end wall) for the axial-flow path. In the case where a circumferential wall of the stator is provided at a tip of the vanes 19, the tip side wall is a radial inner wall (an inner end wall) for the axial-flow path.

The wall configuration of the present invention is applicable to the circumferential wall of the rotor at the hub of the blades 14, the circumferential wall of the rotor at the tip of the blades 14, the circumferential wall of the stator at the hub of the vanes 19, and the circumferential wall of the stator at the tip of the vanes 19.

Figure 2:
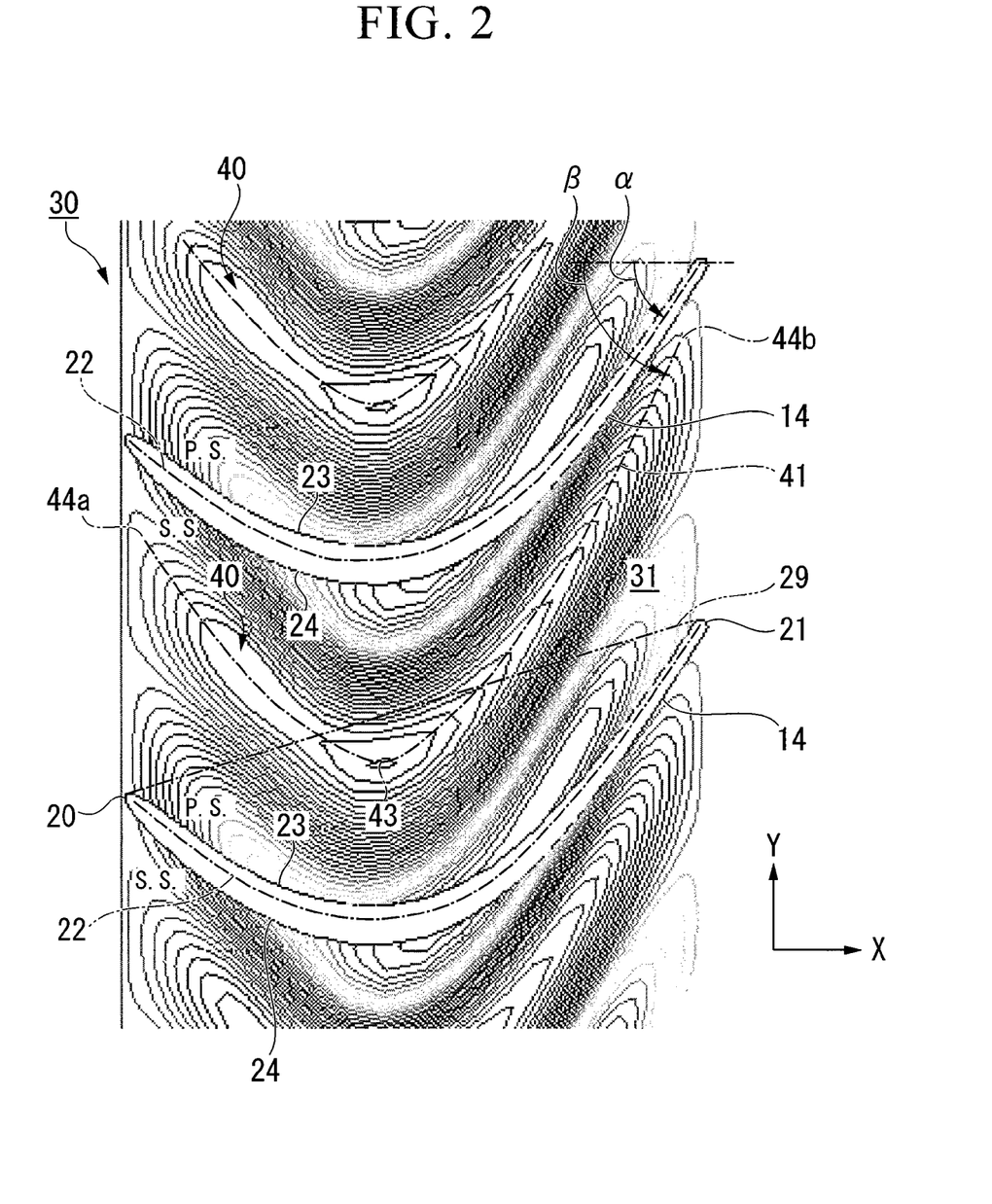
FIG. 2 shows an embodiment in which the wall configuration of the present invention is applied to the hub side wall of the rotor, by using contour lines of surface heights in a region between the blades.
Figure 3:
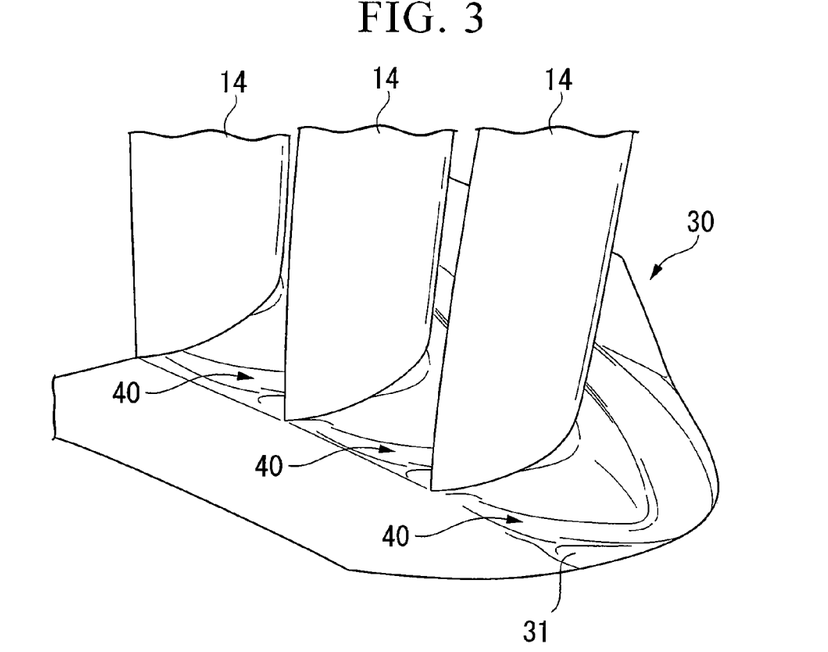
FIG. 3 is a perspective view showing a vicinity of the wall of the blade row.

FIG. 2 shows an embodiment in which the wall configuration of the present invention is applied to the hub side wall of the rotor, by using contour lines of surface heights (radial positions, contours) in a region between the blades. FIG. 3 is a perspective view showing a vicinity of the wall of the blade row.

As shown in FIG. 2, each of the blades 14 includes a leading edge 20, a trailing edge 21, a pressure surface (P.S.) 23, a suction surface (S.S.) 24, and a curvature (a camber line 22) protruding in one circumferential direction. Because of the camber line 22 of the blade 14, the sectional area of the axial-flow path reduces from the vicinity of the middle of the blade 14 toward the trailing edge 21 of the blade 14.

As shown in FIG. 2 and FIG. 3, a trough 40 is formed on the radial wall 31 of the blade row 30 and formed in each region between the blades 14. The trough 40 extends in at least the axial direction (x-direction) of the blade row 30. The region where the trough 40 is formed is axially between the leading edge 20 and the trailing edge 21 of the blade 14. That is, the formation region of the trough 40 is within the chord 29 of the blade 14. In the axial direction, one edge of the trough 40 is axially located adjacent to the leading edge 20 of the blade 14, and another edge of the trough 40 is axially located adjacent to the trailing edge 21 of the blade 14.

Furthermore, as shown in FIG. 2, the trough 40 is formed to generally curve along the camber line 22. That is, the shape of the center line 41 of the trough 40 has a curvature in the same direction as the camber line 22 of the blade 14 (a curvature protruding in the one circumferential direction of the blade row 30). At least a part of the center line 41 of the trough 40 is non-parallel to the camber line 22 of the blade 14. That is to say, the shape phase of the trough 40 changes along the axial chord direction of the blade 14.

Specifically, a trough 40 has a contour which gradually approaches the suction surface 24 toward the vicinity of the trailing edge 21 from the vicinity of the middle of the blade 14. The distance between the center line 41 of the trough 40 and the suction surface 24 of the blade 14 is shortest in the vicinity of the trailing edge 21 of the blade 14 (vicinity of the end of the chord 29). It is preferable that the shortest distance between the center line 41 of the trough 40 and the suction surface 24 of the blade 14 be equal or less than 50 percent of the maximum distance therebetween. Furthermore, in the vicinity of the trailing edge 21 of the blade 14, an angle β is larger than an angle α. The angle β is defined by the center line 41 of the trough 40 and the axis of the blade row 30. That is, the angle (outlet angle) β is defined by the tangential direction of the center line 41 of the trough 40 and the axis of the blade row 30 in the outlet portion of the flow. The angle α is defined by the camber line 22 of the blade 14 and the axis of the blade row 30. That is, the angle (outlet angle) α is defined by the tangential direction of the camber line 22 of the blade 14 and the axis of the blade row 30 in the outlet portion of the flow. In the vicinity of the leading edge 20, the positional relationship between the camber line 22 of the blade 14 and the center line 41 of the trough 40 is varied depending on the blade profile and the flow field. For example, the camber line 22 of the blade 14 may intersect with the center line 41 of the trough 40 in the area between the leading edge 20 and the trailing edge 21 (that is, the shortest distance therebetween may be zero).

Figure 4:
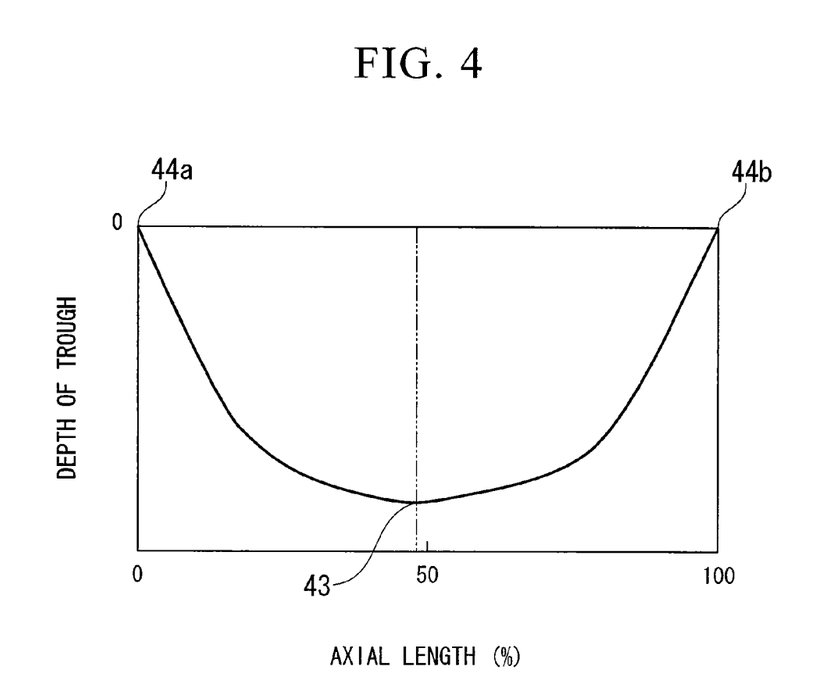
FIG. 4 shows the depth profile of the trough.

FIG. 4 shows the depth profile (sectional profile of the trough projected onto a plane including the axis) of the trough 40 along the axial direction (x-direction) of the blade row 30.

As shown in FIG. 4 and FIG. 2, the depth profile of the trough 40 gradually varies, along the axial direction (x-direction) of the blade row, between a maximum depth (a maximum amplitude, refer to FIG. 2) 43 and the shallowest points (minimum amplitudes, refer to FIG. 2) 44a and 44b. The maximum amplitude 43 of the trough 40 is located adjacent to the axial center of the blade 14 or located axially between the axial center and the leading edge 20 of the blade 14. The minimum amplitudes 44a and 44b of the trough 40 are located axially adjacent to the leading edge 20 and the trailing edge 21 of the blade 14.

Here, a distance between the leading edge 20 and the trailing edge 21 of the blade 14 is defined as an "axial chord length", and measured from the leading edge 20 along the axis of the blade row 30.

Figure 5A:
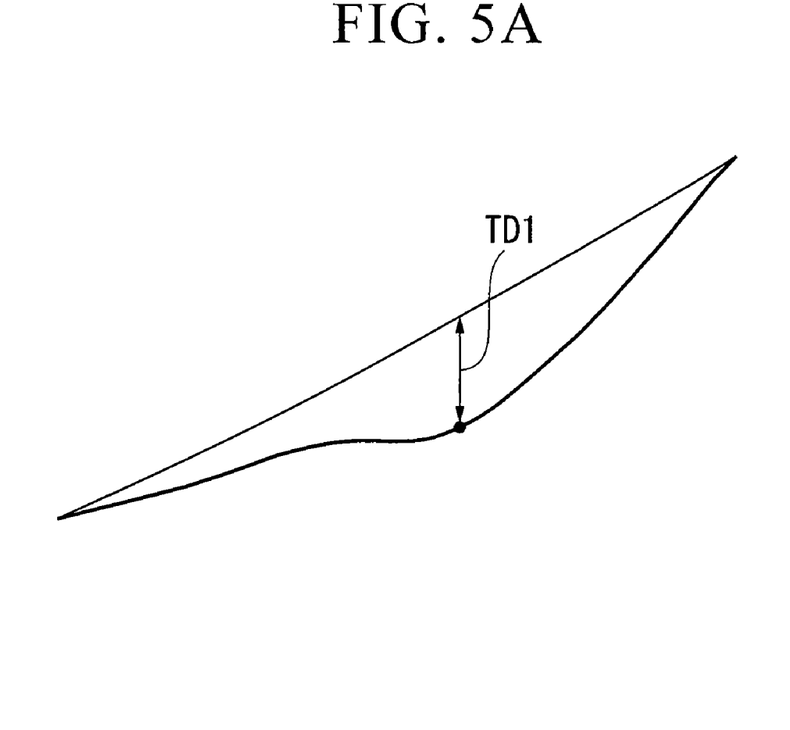
FIG. 5A is a drawing illustrating definition of the depth of the trough.
Figure 5B:
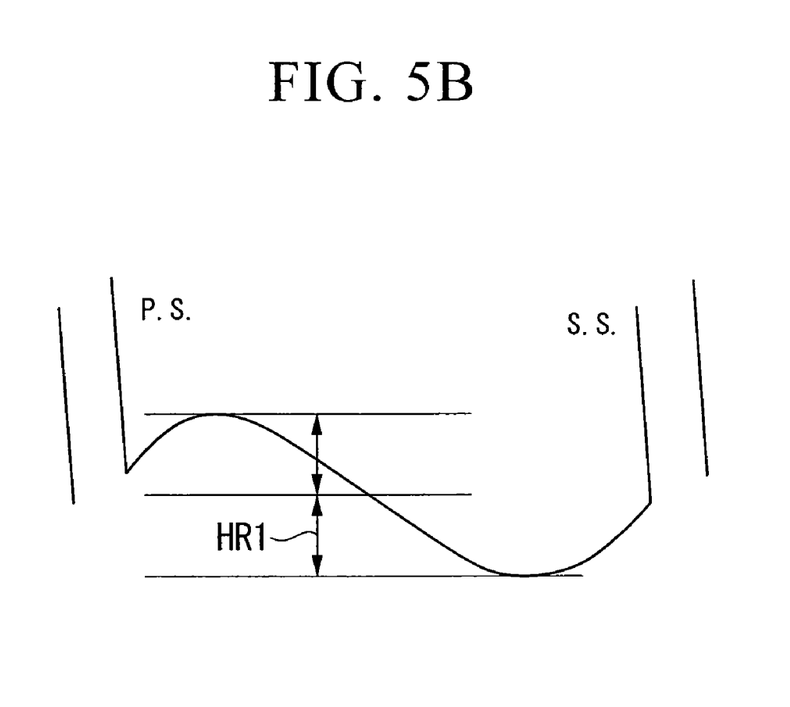
FIG. 5B is a drawing illustrating another definition of the depth of the trough.

The depth of the trough 40 can be defined as TD1 shown in FIG. 5A. TD1 is a difference of radius between the depth profile and the reference base (cylinder base or circular conical base) of the axial-flow path. Alternatively, the depth of the trough 40 can be defined as HR1 shown in FIG. 5B. HR1 is half of the peak to peak of the amplitude in a sectional plane perpendicular to the axis of the blade row 30. In either case of using TD1 or using HR1, the maximum amplitude 43 of the trough 40 is axially located within 20% to 60%, preferably within 20% to 50%, more preferably 30% to 50% of the axial chord length.

Furthermore, as shown in FIG. 4 and FIG. 2, the trough 40 shallows gradually, along the extended direction of the trough 40, from the maximum depth 43 toward both the shallowest points 44a and 44b at both ends. That is, the trough 40 starts at the shallowest point 44a in the vicinity of the leading edge 20 of the blade 14, increases its depth toward the maximum depth (maximum amplitude 43) between the leading edge 21 and the vicinity of the middle of the blade 14, decreases its depth thereafter and ends at another shallowest point 44b in the vicinity of the trailing edge 21 of the blade 14. The contour of the trough 40 between the maximum depth 43 and the shallowest points 44a or 44b is near uniformly smooth or is not near uniformly smooth. As described above, the distance between the center line 41 of the trough 40 and the suction surface 24 of the blade 14 is relatively short in the vicinity of the trailing edge 21 of the blade 14. Therefore, in an area between the vicinity of the middle of the blade 14 and the vicinity of the trailing edge, the central depth of the trough 40 has a deep depth at a part distant from the suction surface 24 of the blade 14 and has a shallow depth at a part near the suction surface 24.

Figure 6A:
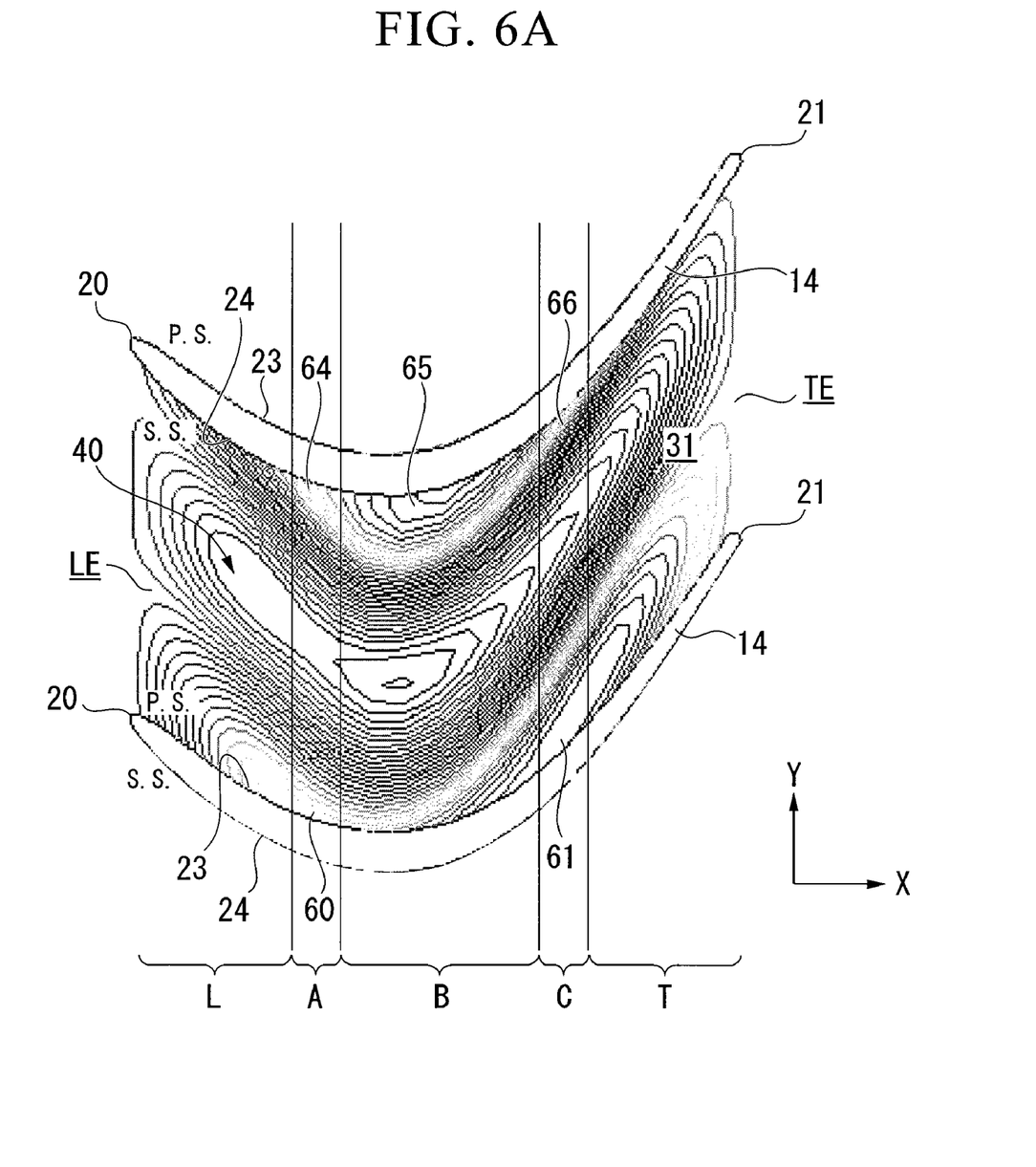
FIG. 6A is a drawing illustrating the profile of the trough.
Figure 6B:
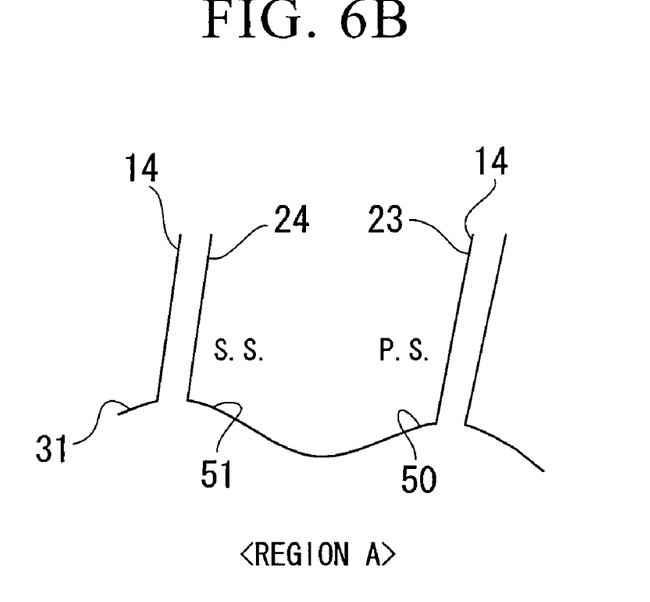
FIG. 6B is a drawing showing the circumferential profile of the wall in region A shown in FIG. 6A.
Figure 6C:
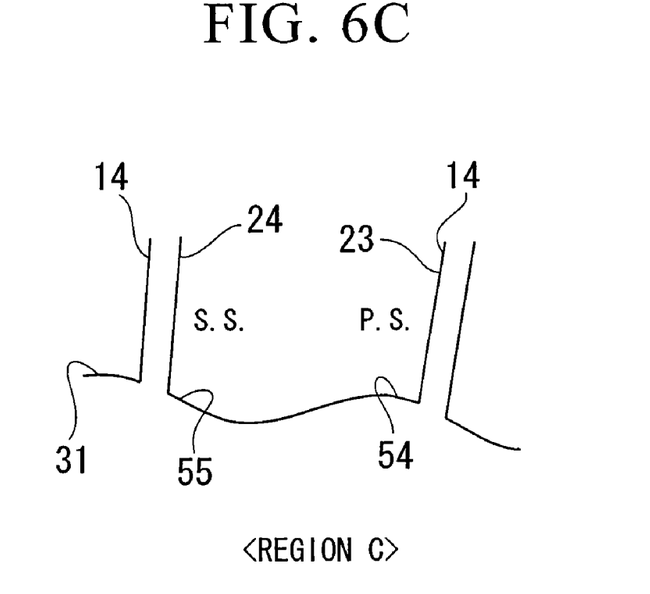
FIG. 6C is a drawing showing the circumferential profile of the wall in region C shown in FIG. 6A.

FIG. 6A is a drawing for explanation of the profile of the trough 40. FIGS. 6B and 6C are drawings (convex-concave distribution map of the wall) showing the circumferential profile of the wall 31 having the trough 40 (circumferential contour, or cross sectional view (cross section orthogonal to the axis) of the wall).

As shown in FIG. 6A, at the leading edge (LE) and the trailing edge (TE) of the blade 14, the wall is cylindrical and thus its circumferential profile (circumferential contour) is an arc. That is, there is substantially no concavity in the circumferential profile of the wall 31 at the LE and the TE.

Here, the wall 31 between about 30% to 40% of the axial chord length is referred to as region A, the wall 31 between about 60% to 90% of the axial chord length is referred to as region C, the wall 31 between about 40% to 60% of the axial chord length (i.e., between region A and region C) is referred to as region B. The circumferential configuration (convex or concave) of the wall 31 is defined in regions A and C, and region B is a transition region where the configuration changes depending on the shape of the blades and the flow field. The ranges of region A and C are suitably changed by the place in which the wall configuration of the invention is provided, the shape of the blades, and the flow field. For example, the range of region C (about 60%-90%) can be set as 60%-90%, 60%-80%, 70%-90%, 70%-80%, 80%-90%, 70%-85%, 75%-90%, or 80%-95%.

As shown in FIG. 6B, the circumferential profile (circumferential contour) of the wall 31 in region A has a convex portion 50 adjacent to the pressure surface (P.S.) 23 of the blade 14, another convex portion 51 adjacent to the suction surface (S.S.) 24 of the adjacent blade 14, and a concave portion formed between the two convex portions. This convex/concave/convex profile in region A is referred to as a first profile. The convex portion has positive curvature. The concave portion has negative curvature.

As shown in FIG. 6C, the circumferential profile of the wall 31 in region C has a convex portion 54 adjacent to the pressure surface (P.S.) 23 of the blade 14, and a concave portion 55 adjacent to the suction surface (S.S.) 24 of the adjacent blade 14. The region between the convex portion 54 and the concave portion 55 is smoothly transited. This convex profile at the pressure surface/concave profile at the suction surface in region C is referred to as a second profile.

As shown in FIG. 6A, in region B, the circumferential profile of the wall 31 smoothly changes from the first profile to the second profile.

The region between the LE and region A (i.e., about 0%-30% of the axial chord length) is a transition region referred to as region L. The circumferential profile of the wall 31 in region L smoothly changes from the arc at the LE toward the first profile (convex/concave/convex) of region A.

The region between region C and the TE (i.e., about 90%-100% of the axial chord length) is also a transition region referred to as region T. The circumferential profile of the wall 31 in region T smoothly changes from the second profile (convex profile at the pressure surface/concave profile at the suction surface) in region C toward the arc at the TE.

As described above, the trough 40 has the maximum amplitude 43 between 20%-60% of the axial chord length within region L, region A, or region B.

The contour of the wall 31 along the pressure surface 23 of the blade 14 (i.e., PS-contour) except the LE and the TE has a continuous ascent from the reference base (cylinder base or circular conical base) of the axial-flow path. As shown in FIG. 6A, the PS-contour has a convex region 60 having positive curvature in the vicinity of the leading edge 20 of the blade 14, and a convex region 61 having positive curvature in the vicinity of the trailing edge 21 of the blade 14. The region between the convex region 60 and the convex region 61 is a transition region. The PS-contour smoothly changes from the convex region 60 toward the convex region 61 in this transition region. Alternatively, in the transition region, a concave portion having negative curvature may be formed.

Figure 7:
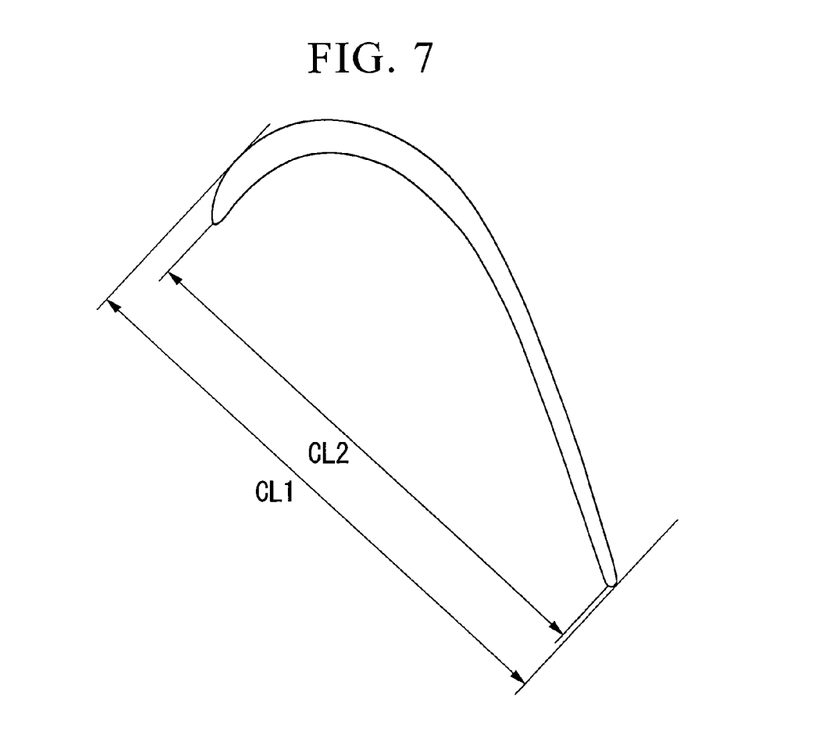
FIG. 7 is a drawing illustrating definitions of the chord length of the blade.

The contour of the wall 31 along the suction surface 24 of the blade 14 (i.e., SS-contour) has a main region in a position radially higher than the reference base (cylinder base) of the axial-flow path, and a partial region in which the radially height from the reference base changes depending on the shape of the blades and the flow field. The partial region changes to a radially high level, a substantially even level, or a radially low level compared to the reference base depending on the shape of the blades and the flow field. As shown in FIG. 6A, the SS-contour has a convex region 64 having positive curvature in the vicinity of the leading edge 20 of the blade 14, a convex region 65 having positive curvature in the vicinity of the middle, and a concave region 66 having negative curvature in the vicinity of the trailing edge 21. The concave region 66 in the SS-contour is equal or less than 50% of the chord length of the blade 14. It should be noted that, as shown in FIG. 7, this chord length can be defined as a distance (CL2) between the tip of the leading edge and the tip of the trailing edge, or a distance (CL1) between two points at which a line, perpendicular to tangent line of the leading edge or the trailing edge, is contacted with the leading edge or the trailing edge.

Figure 8:
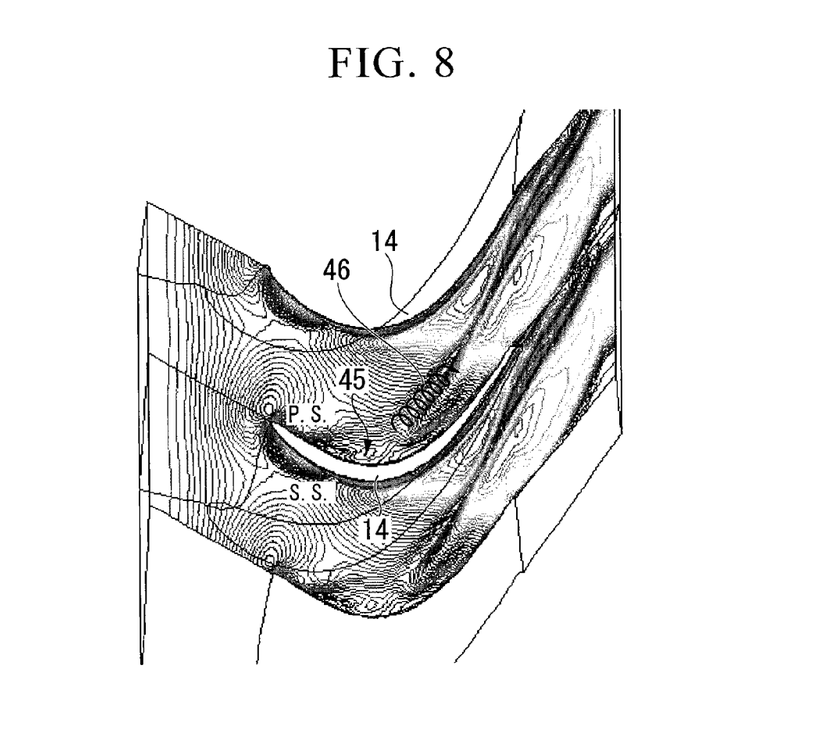
FIG. 8 shows flow field near a wall (Mach number distribution near the wall surface) of a comparative example in the case where the wall of the blade row is substantially even.
Figure 9A:
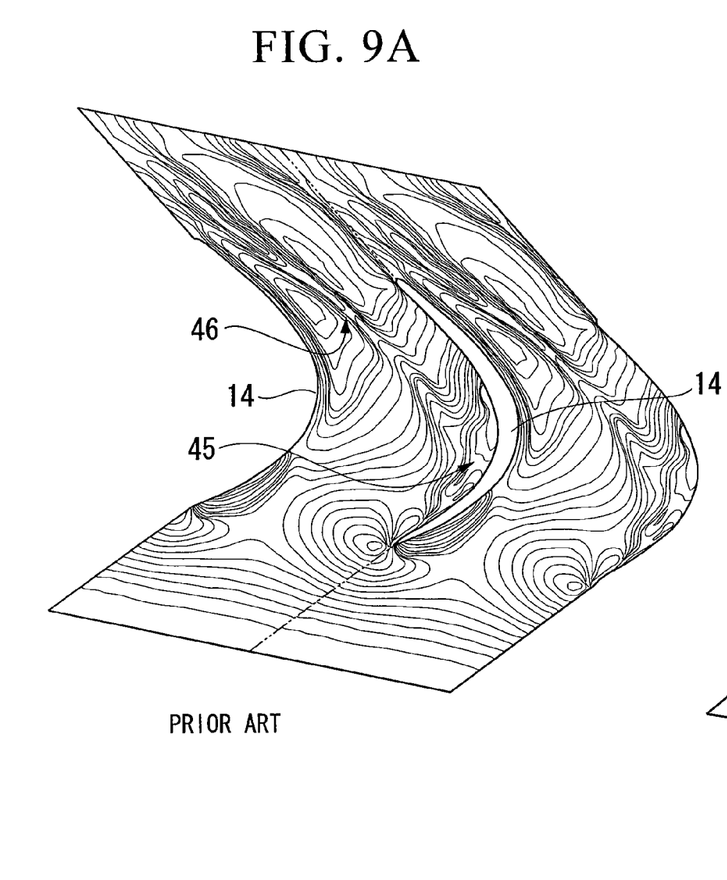
FIG. 9A shows flow field near the wall (Mach number distribution near the wall surface) of the comparative example in the case where the wall of the blade row is substantially even.

FIG. 8 and FIG. 9A show a flow field near a wall (Mach number distribution near the wall surface) of a comparative example in the case where the wall of the blade row is substantially even.

As shown in FIG. 8 and FIG. 9A, a flow separation 45 is partially generated on the wall surface in the vicinity of the pressure surface (P.S.) of the blade 14 (for example, in the vicinity of the center in the chord direction). By interaction of the flow separation and the boundary layer, a strong vortex 46 having a different flow direction/axis from the main flow is generated. The starting point of the vortex 46 is substantially located at the interaction portion of the flow separation and the boundary layer, relatively near the pressure surface of the blade, and located in the vicinity of the middle of the blade 14 or between the middle of the blade and leading edge. The vortex 46 can reach the vicinity of the suction surface and the vicinity of the trailing edge of the blade.

Figure 9B:
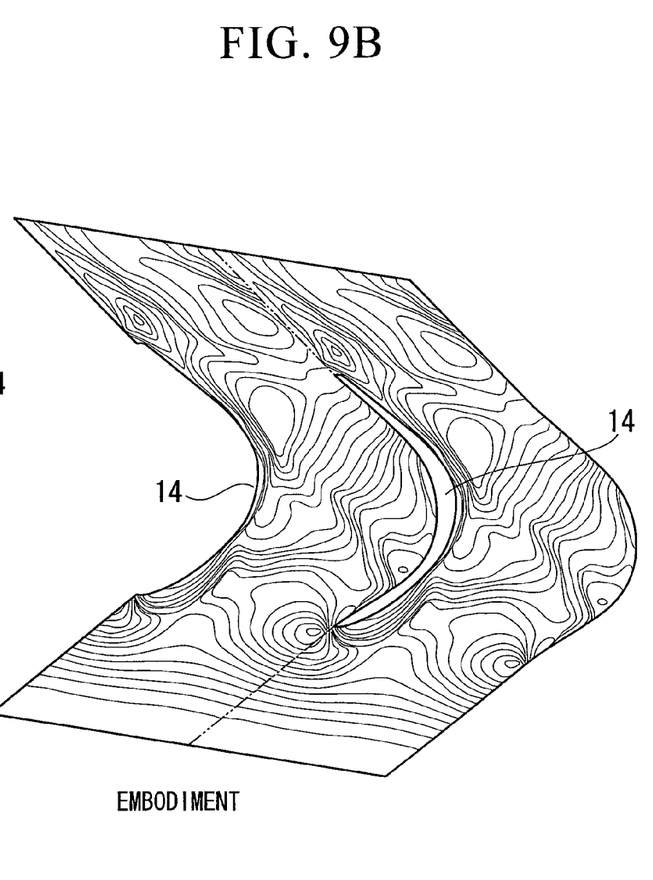
FIG. 9B shows flow field near the wall (Mach number distribution near the wall surface) of the embodiment with the wall configuration of the invention.

FIG. 9B shows the flow field near the wall (Mach number distribution near the wall surface) of the embodiment with the wall configuration of the invention shown in FIG. 2 to FIG. 6C.

As is clear from FIG. 9B, in the embodiment of the wall configuration of the invention, the vortex is weaker and the turbulence of the flow on the wall is on a smaller scale, than that of the comparative example. Accordingly, in the embodiment, the loss of flow (pressure loss, energy loss) can be inhibited.

Figure 10:
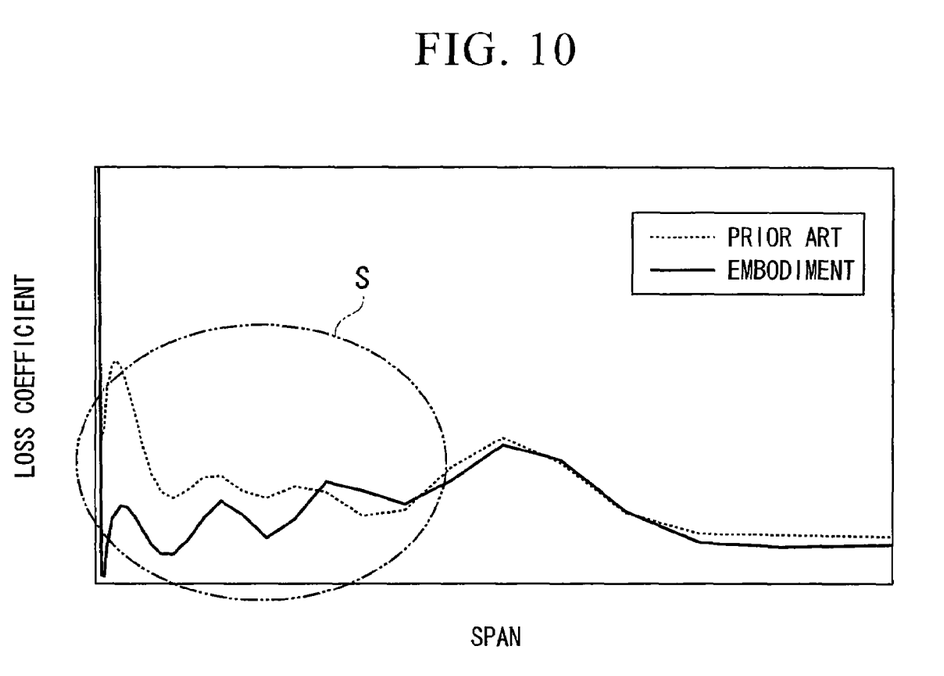
FIG. 10 is a graph diagram showing a change of the secondary flow loss.

FIG. 10 is a graph diagram showing a change of the secondary flow loss. In FIG. 10, a horizontal axis indicates a span (radially height of the blade row), and a vertical axis indicates the loss of flow (loss coefficient).

As is clear from FIG. 10, in the embodiment of the wall configuration of the invention, the loss of flow is less than that of the comparative example. The loss reduction is of particular note in the vicinity of the wall surface, as indicated by "S" shown in the figure.

The loss reduction similar to the above is analytically confirmed in each case where the wall configuration of the invention is applied to the hub side wall of the blades 14 in another stage of the rotor, the tip side wall of the blades 14 of the rotor, the hub side wall of the vanes 19 of the stator, and tip side wall of the vanes 19 of the stator.

As described above, in the wall configuration of the invention, the vortex, generated by the interaction of the flow separation on the pressure side of the blade and boundary layer, is depressed by the trough between the blades. As a result, the loss of flow due to the vortex can be reduced.

The center line of the trough has the curvature in the same direction as the camber line of the blade. It is advantageous to avoid the generation of another vortex.

The maximum amplitude of the trough is located adjacent to the axial center of the blade or located axially between the axial center and the leading edge of the blade. This means that the maximum amplitude of the trough is located adjacent to the generation point of the vortex. Therefore, in the cross section (cross section orthogonal to the axis), the magnitude of the change in the curvature of the trough is relatively large in the vicinity of the generation point of the vortex.

In addition, in the vicinity of the leading edge of the blade, the contour of the wall (circumferential contour, and the contour along the pressure surface) has the convex profile in the vicinity of the pressure surface of the blade. This also means that in the cross section (cross section orthogonal to the axis), the magnitude of the change in the curvature of the trough is relatively large in the vicinity of the generation point of the vortex.

In the case where the magnitude of the change in the bottom curvature of the trough is relatively large in the cross section, the flow is accelerated in the pressure surface side of the blade. This flow acceleration suppresses the growth of the boundary layer in the pressure side of the blade. Furthermore, the flow acceleration decreases the pressure in the suction surface side of the blade. It is advantageous to depress the pressure difference between the pressure surface side of the blade and the suction surface side of the blade in the vicinity of the trailing edge. As a result, the transit flow between the blades is weak.

In the vicinity of the trailing edge of the blade, the contour of the wall (circumferential contour, and the contour along the pressure surface) has a concave profile in the vicinity of the suction surface of the blade. Therefore, the pressure is relatively high in the vicinity of the reachable position of the vortex. The high pressure near the vicinity of the reachable position of the vortex can weaken the vortex.

It is preferable that the position and the configuration of the trough (trough 40 shown in FIG. 2) be optimally designed according to the generation point of the vortex and its central axis in the case where the wall is even. In this design, for example, the maximum amplitude of the trough can be adjacent to the starting point of the vortex. Furthermore, the extending direction of the trough can generally approximate the axial direction of the vortex. The wall configuration shown in FIGS. 2 to 6C is one embodiment. The wall configuration of the blade row is optimized depending on the shape of the blades and the flow field.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:

1. A wall configuration of a radial wall facing a flow path of an axial-flow machine that comprises a blade row, the wall configuration comprising:
   a trough formed between a blade and another blade in the blade row and substantially extending in an axial direction of the blade row, the region where the trough is formed being axially between a leading edge and a trailing edge of the blade, a center line of the trough having a curvature in the same direction as a camber line of the blade, a maximum amplitude of the trough being located adjacent to a center of the blade in the axial direction or located between the center of the blade in the axial direction and the leading edge of the blade, and at least a part of the center line of the trough in a vicinity of the trailing edge of the blade being nearer to a suction surface of the blade than a maximum distance between the centerline of the trough and the suction surface of the blade, from a vicinity of the middle of the blade to a vicinity of the trailing edge of the blade.

2. The wall configuration of the axial-flow machine according to claim 1, wherein the maximum amplitude of the trough is located within 20 to 60 percent of an axial distance between the leading edge and the trailing edge of the blade from the leading edge of the blade.

3. The wall configuration of the axial-flow machine according to claim 2, wherein the maximum amplitude of the trough is located within 30 to 50 percent of the axial distance between the leading edge and the trailing edge of the blade from the leading edge of the blade.

4. The wall configuration of the axial-flow machine according to claim 1, wherein at least a part of the center line of the trough is non-parallel to the camber line of the blade.

5. The wall configuration of the axial-flow machine according to claim 1, further comprising the part of the trough being near to a suction surface of the blade from a vicinity of the middle of the blade to a vicinity of the trailing edge of the blade is at a location between about 80-100% of the axial chord length in the axial direction.

6. The wall configuration of the axial-flow machine according to claim 1, wherein a distance between the center line of the trough and a suction surface of the blade has a shortest distance at a vicinity of the trailing edge of the blade.

7. The wall configuration of the axial-flow machine according to claim 1, wherein a circumferential wall profile has an arc at each of the leading edge and the trailing edge of the blade.

8. The wall configuration of the axial-flow machine according to claim 1, wherein a circumferential wall profile in a vicinity of the leading edge of the blade comprises a convex profile adjacent to a pressure surface of the blade and another convex profile adjacent to a suction surface of the blade.

9. The wall configuration of the axial-flow machine according to claim 1, wherein a circumferential wall profile in a vicinity of the trailing edge of the blade comprises a concave profile adjacent to a suction surface of the blade.

10. The wall configuration of the axial-flow machine according to claim 9, wherein the circumferential wall profile in the vicinity of the trailing edge of the blade further comprises a convex profile adjacent to a pressure surface of the blade.

11. The wall configuration of the axial-flow machine according to claim 1, wherein a contour along a pressure surface of the blade comprises a convex region in a vicinity of the leading edge of the blade and another convex region in a vicinity of the trailing edge of the blade.

12. The wall configuration of the axial-flow machine according to claim 1, wherein a contour along a suction surface of the blade comprises a convex region in a vicinity of the leading edge of the blade and a concave region in a vicinity of the trailing edge of the blade.

13. The wall configuration of the axial-flow machine according to claim 12, wherein the concave region in the vicinity of the trailing edge of the blade is 50 percent or less of a chord length of the blade.

14. A gas turbine engine, comprising:
   stator vanes; and
   rotor blades, wherein
   at least one of a wall at a hub side of the stator vanes, a wall at a tip side of the stator vanes, a wall at a hub side of the rotor blades, and a wall at a tip side of the rotor blades has the wall configuration according to claim 1.

15. A wall configuration of a radial wall facing a flow path of an axial-flow machine that comprises a blade row, the wall configuration comprising:
   a trough formed between a blade and another blade in the blade row and substantially extending in an axial direction of the blade row, the region where the trough is formed being axially between a leading edge and a trailing edge of the blade, a center line of the trough having a curvature in the same direction as a camber line of the blade, a maximum amplitude of the trough being located adjacent to a center of the blade in the axial direction or located between the center of the blade in the axial direction and the leading edge of the blade, and a distance between the center line of the trough and a suction surface of the blade having a shortest distance at a location between about 80%-100% of the axial chord length in the axial direction.

16. A wall configuration of a radial wall facing a flow path of an axial-flow machine that comprises a blade row, the wall configuration comprising:
   a trough formed between a blade and another blade in the blade row and substantially extending in an axial direction of the blade row, the region where the trough is formed being axially between a leading edge and a trailing edge of the blade, a center line of the trough having a curvature in the same direction as a camber line of the blade, a maximum amplitude of the trough being located adjacent to a center of the blade in the axial direction or located between the center of the blade in the axial direction and the leading edge of the blade, a part of the trough being near to a suction surface of the blade from a vicinity of the middle of the blade to a vicinity of the trailing edge of the blade, and a distance between the center line of the trough and a suction surface of the blade having a shortest distance at a location between about 80%-100% of the axial chord length in the axial direction.

17. A wall configuration of a radial wall facing a flow path of an axial-flow machine that comprises a blade row, the wall configuration comprising:

a trough formed between a blade and another blade in the blade row and substantially extending in an axial direction of the blade row, the region where the trough is formed being axially between a leading edge and a trailing edge of the blade, a center line of the trough having a curvature in the same direction as a camber line of the blade, a maximum amplitude of the trough being located adjacent to a center of the blade in the axial direction or located between the center of the blade in the axial direction and the leading edge of the blade, and a circumferential wall profile in a vicinity of the trailing edge of the blade comprising a concave profile adjacent to a suction surface of the blade.

18. The wall configuration of a radial wall facing a flow path of an axial-flow machine according to claim 17, further comprising at least a part of the center line of the trough in a vicinity of the trailing edge of the blade being nearer to a suction surface of the blade than a maximum distance between the centerline of the trough and the suction surface of the blade, from a vicinity of the middle of the blade to a vicinity of the trailing edge of the blade.

19. A wall configuration of a radial wall facing a flow path of an axial-flow machine that comprises a blade row, the wall configuration comprising:

a trough formed between a blade and another blade in the blade row and substantially extending in an axial direction of the blade row, the region where the trough is formed being axially between a leading edge and a trailing edge of the blade, a center line of the trough having a curvature in the same direction as a camber line of the blade, a maximum amplitude of the trough being located adjacent to a center of the blade in the axial direction or located between the center of the blade in the axial direction and the leading edge of the blade, and a contour along a suction surface of the blade comprising a convex region in a vicinity of the leading edge of the blade and a concave region in a vicinity of the trailing edge of the blade.

20. The wall configuration of a radial wall facing a flow path of an axial-flow machine according to claim 19, further comprising a distance between the center line of the trough and a suction surface of the blade having a shortest distance at a vicinity of the trailing edge of the blade.

* * * * *